W. E. STANDLEY & T. B. CAMPBELL.
GLASS DRAWING AND BLOWING APPARATUS.
APPLICATION FILED AUG. 20, 1915.

1,285,450.

Patented Nov. 19, 1918.
6 SHEETS—SHEET 1.

FIG. 1

WITNESSES

INVENTORS

W. E. STANDLEY & T. B. CAMPBELL.
GLASS DRAWING AND BLOWING APPARATUS.
APPLICATION FILED AUG. 20, 1915.

1,285,450.

Patented Nov. 19, 1918.
6 SHEETS—SHEET 3.

WITNESSES

INVENTORS

W. E. STANDLEY & T. B. CAMPBELL.
GLASS DRAWING AND BLOWING APPARATUS.
APPLICATION FILED AUG. 20, 1915.

1,285,450.

Patented Nov. 19, 1918.
6 SHEETS—SHEET 4.

WITNESSES

INVENTORS

W. E. STANDLEY & T. B. CAMPBELL.
GLASS DRAWING AND BLOWING APPARATUS.
APPLICATION FILED AUG. 20, 1915.

1,285,450.

Patented Nov. 19, 1918.
6 SHEETS—SHEET 5.

WITNESSES

INVENTORS

WILLIAM E. STANDLEY AND THOMAS B. CAMPBELL, OF PITTSBURGH, PENNSYLVANIA, ASSIGNORS TO WINDOW GLASS ROTARY POT COMPANY, A CORPORATION OF PENNSYLVANIA.

GLASS DRAWING AND BLOWING APPARATUS.

1,285,450.

Specification of Letters Patent.

Patented Nov. 19, 1918.

Application filed August 20, 1915. Serial No. 46,441.

*To all whom it may concern:*

Be it known that we, WILLIAM E. STANDLEY and THOMAS B. CAMPBELL, citizens of the United States, and residents of Pittsburgh, in the county of Allegheny and State of Pennsylvania, have invented a new and useful Improvement in Glass Drawing and Blowing Apparatus, of which the following is a specification.

This invention relates to glass drawing and blowing apparatus, and particularly to apparatus for making window glass by means of the usual drawing bait.

The object of the invention is to provide improved apparatus for producing window glass of high quality and at a reduced cost for labor and in a manner to avoid waste of material and reheating and handling of unused material. A further object of the invention is to provide glass drawing apparatus having a large capacity for its size and which thereby reduces the overhead charge for space and installation, which can be readily operated by the ordinary skilled mechanic in this art but with a smaller number of operators for each machine, so that the net cost of the glass is thereby reduced. A further object of the invention is to provide apparatus of this kind which is semi-automatic in operation and is thereby readily controlled in its several movements, whose operating mechanism is simple and not liable to easily get out of order, and which automatically controls the supply of fuel so as to reduce the cost of the same and prevent burning out the furnace. Further objects of the invention are in part obvious and in part will appear more in detail hereinafter.

The invention comprises the construction and arrangement of parts hereinafter described and claimed.

In the drawings, which represent one embodiment of the invention.

The apparatus shown in the drawings comprises a suitable furnace 1 of circular form having an outer wall 2 supported upon piers or legs 3 and an inner wall carried by a central column 4. The annular space between the outer wall 2 and central column 4 is bricked over at the top to form a roof 5, which is provided at suitable intervals with openings 6 closed by the movable doors or covers 7, one of said doors being preferably provided at each station of the furnace, as more fully hereinafter described.

Within said annular space is located a rotatable hearth or body 8, having inner and outer metal walls 9 supporting the inner and outer brick walls 10, said walls 9 at their lower edges being bent to form circular flanges which support the brickwork and rest and roll upon antifriction members, such as the rollers 11, carried by pillars 12 resting on the floor. The space between the inner and outer brick walls 10 of the hearth is divided by radiating walls 12$^a$ (four of which are shown), into a series of chambers 12$^b$ provided with arched bottoms or floors 13 having central openings 14 therein for the introduction of fuel to said chambers. Each chamber is preferably filled with suitable checker work, as shown, to conserve the heat, and is covered by a roof 15 having ports or openings 15$^a$ for the gases and whose upper surface is flat to form a floor to receive the pot or crucible 16. The radiating walls 12$^a$ extend above the floor 15 to the upper end of the body 8, as will be readily understood, so as to separate the pots 16 from each other.

The hearth may be rotated in any suitable manner, but is shown as having its outer metal wall 9 provided with a large gear 17 meshing with a gear 18 on a radial shaft 19 provided at its outer end with a large gear 20 meshing with a small gear 21 on a shaft 22 at one side of the shaft 19. Shaft 22 is connected by a friction clutch 23 with the first large gear 24 of a train of speed reducing gears connected to the gear 25 on the shaft of a motor 26. In operation of the machine the motor 26 runs constantly and the clutch 23 is closed whenever it is desired to rotate the hearth, as hereinafter described.

The furnace may be heated in any suitable manner, but preferably by gas in order to easily regulate the consumption of fuel and the temperature at the various stations of the furnace. As shown, the furnace is surrounded by a manifold 30 connected to a gas supply pipe 31 in which is a suitable regulating valve 32. Below said manifold is a larger manifold 33 connected by a conduit 34 provided with a regulating valve 35 to a suitable source of compressed air. At each station of the furnace is provided a nozzle 36 pointing upwardly beneath the opening 14 in the floor of one section of the furnace when at that station and communicating with branch pipes 37 and 38 leading to the gas and air manifolds 30 and 33. These branch pipes are preferably provided with individual regulating valves 39 and 40 so that the supply of gas and air at each station of the furnace may be regulated to produce the proper temperature at that station, independently of all other stations, as will be readily understood.

Figure 2:
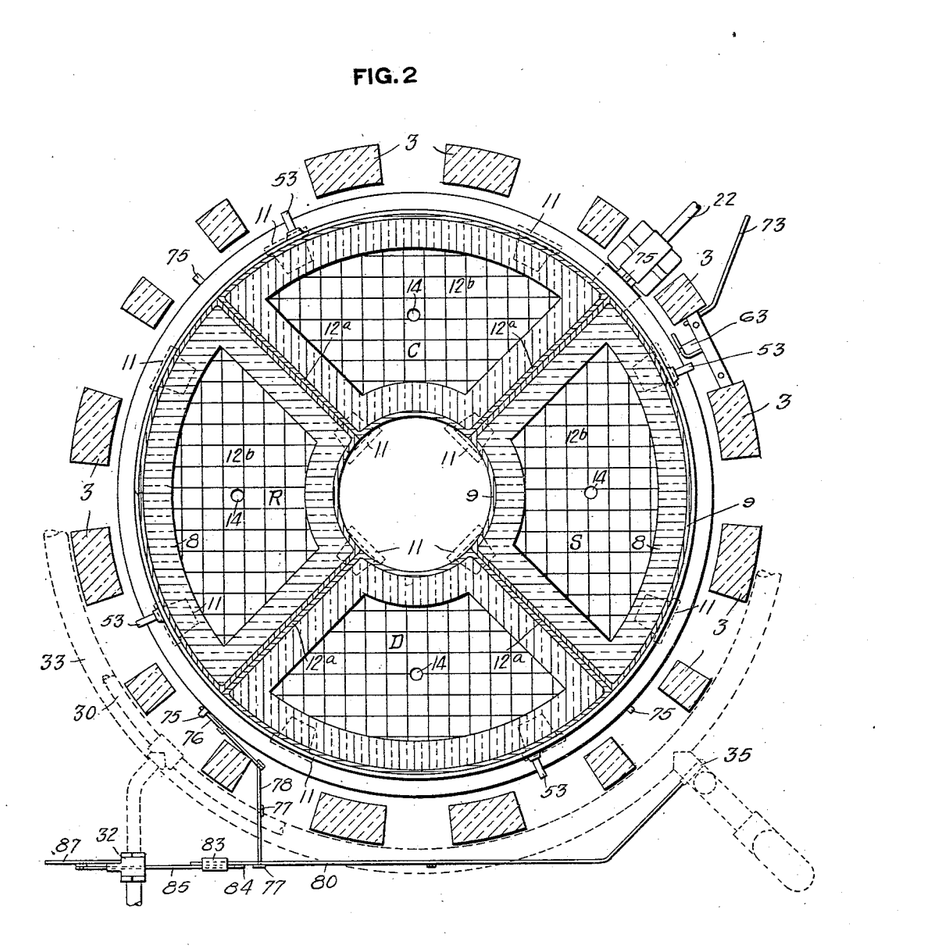
Fig. 2 is a sectional plan view on the line 2—2, Fig. 1, the operating mechanism being omitted.
Figure 3:
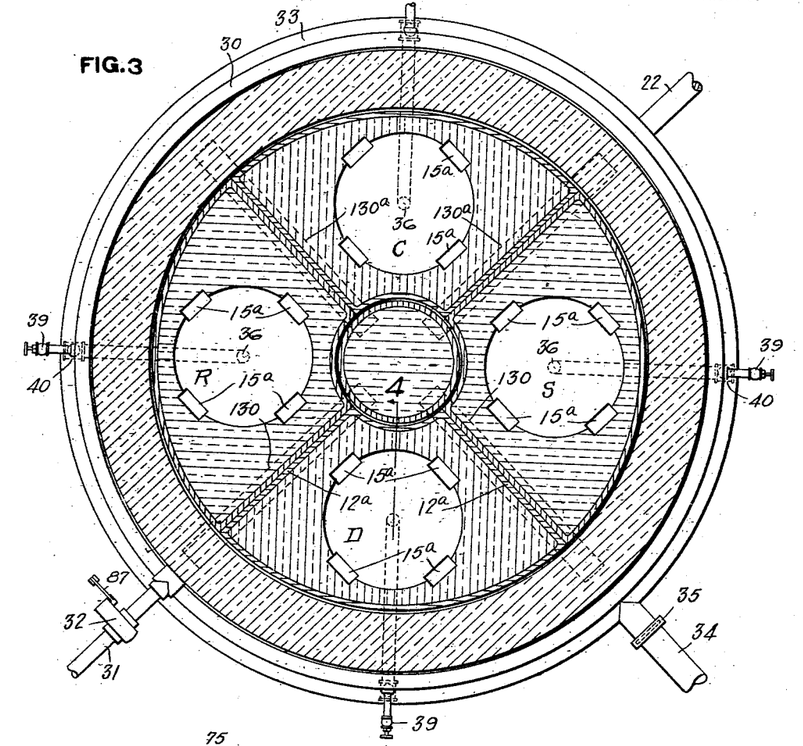
Fig. 3 is a similar view on the line 3—3, Fig. 1.

The four stations of the furnace, lettered in order in Figs. 2 and 3 as C, S, D, R, are respectively, the charging and heating station, the settling station, the drawing station, and the reheating station. Each section of the hearth 8 is supplied with a pot 16, and by successive rotations of the hearth or body said pots are in turn passed to the several stations of the furnace. At station C the pot is filled with a charge of molten glass drawn from an ordinary tank furnace of suitable construction (not shown). The charging is done while a glass cylinder is drawn at station D. Each drawing operation requires a period of time sufficient to enable the new charge at station C to be there heated to a temperature above the ordinary working temperature of the glass to thereby expand and drive off any blisters or bubbles. At station S the supply of fuel is a little less than at station C, so that the temperature is a little lower and at the proper working temperature for the glass. At this station the metal in the pot is allowed to settle and become quiescent ready for the drawing operation at station D, where the glass cylinder is drawn by the usual bait apparatus. At station R the pot and any extra glass therein are reheated to the proper temperature to receive a new charge of molten glass at station C.

Figure 10:
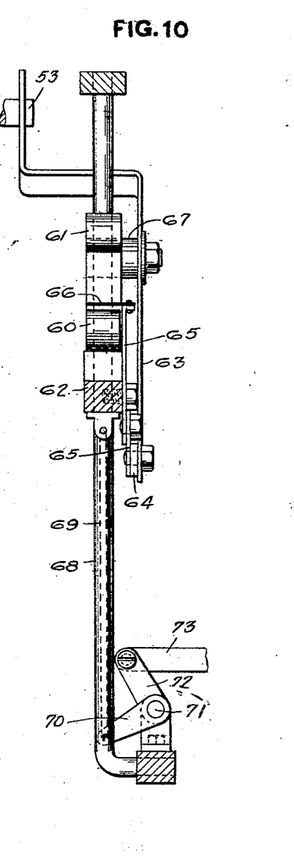
Fig. 10 is a sectional elevation on the line 10—10, Fig. 9.
Figure 11:
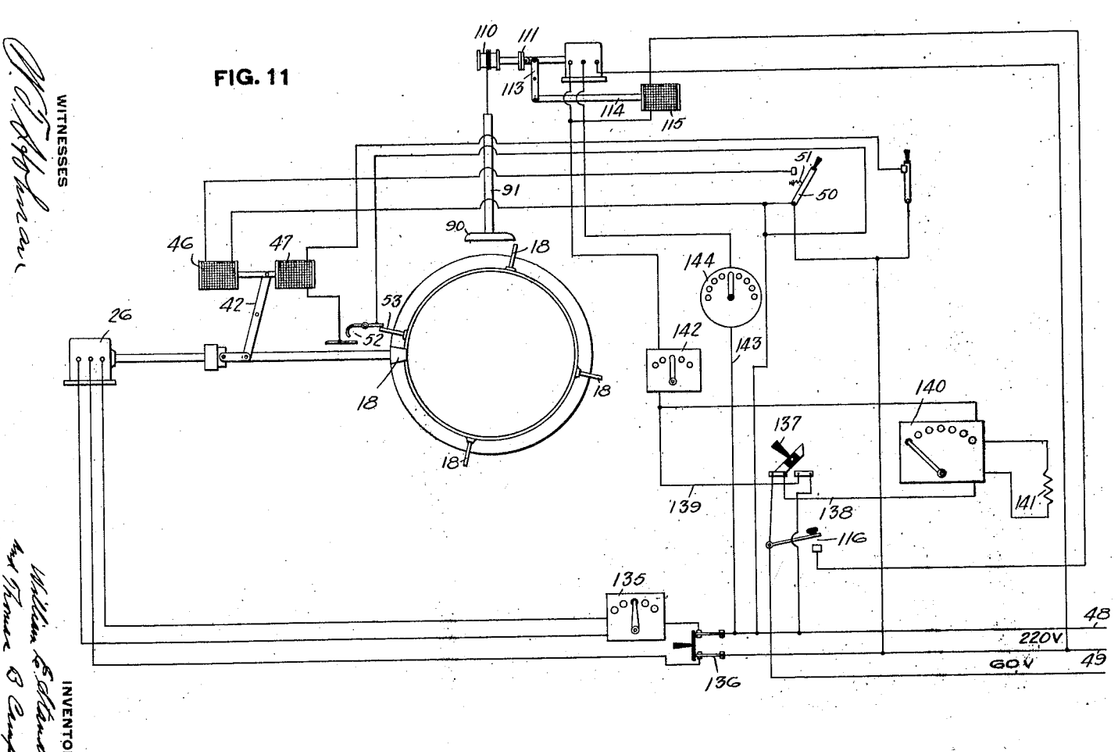
Fig. 11 is a diagrammatic view, showing the electric circuit arrangement.

Suitable means is provided for controlling the driving mechanism to rotate the furnace hearth at intervals to carry the pots in turn to their successive stations, said means being shown as partly electrical and partly mechanical. The clutch 23 is operated by a pivoted lever 41 connected by a link to a lever 42 pivoted on the frame and which may be provided with a handle 43 enabling said clutch to be operated by hand when desired. The lever 42 passes through a yoke 44 on a rod 45, the opposite ends of which form cores coöperating with two magnets or solenoids 46, 47, so that by energizing said solenoids the rod 45 and lever 43 may be moved in either direction to open or close the clutch 23. Referring to Fig. 11, the solenoid 46 is in a circuit from the main current leads 48 and 49, said circuit including a switch 50 normally held in open position by a spring 51. Solenoid 47 is in a circuit from the same leads and includes an automatic switch 52, shown in detail in Figs. 9 and 10 and which is automatically controlled by the rotating table or hearth.

To rotate the hearth one step the operator closes the switch 50, which energizes solenoid 46 and oscillates the lever 42 to close the clutch 23. The constantly running motor 26 is thereby connected to drive the gear 18 and rotate the table. The switch 50 is closed only momentarily, as the operator releases it as soon as it is operated and it is immediately opened by the spring 51. The clutch 23, however, remains closed until an operating pin 53 at the next section of the rotating table engages and operates the switch 52, thereby closing the circuit through the solenoid 47, energizing the same and oscillating the lever 42 to open the clutch 23, which disconnects the power motor from the gear 18. The hearth then stops with each pot therein advanced to the next station.

To accurately locate and lock each pot at its respective station the body 8 may be provided with a notch 54 at each compartment to receive an arm of an oscillating bell crank 55, the other arm of which is connected by a link 56 to a hand lever 57.

Figure 9:
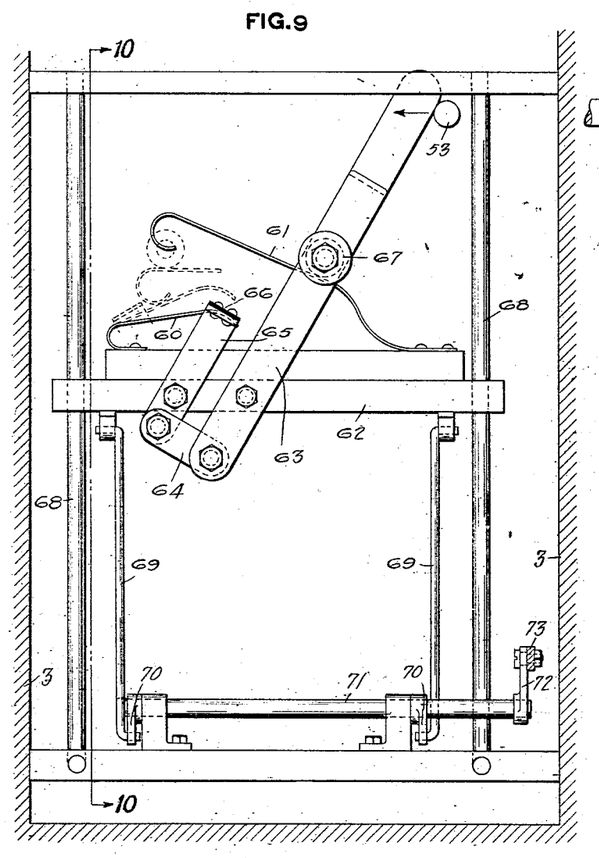
Fig. 9 is a front elevation of an automatic switch.

The mechanism of switch 52 is located between two of the pillars 3 which support the outer furnace wall. It comprises a small spring contact 60 coöperating with a longer spring contact 61, the circuit through the solenoid 47 being closed when said contacts engage with each other. Said contacts are supported by a horizontal member 62 on which is pivoted a lever 63 connected by a link 64 to a second lever 65 also pivoted to said member and provided at its upper end with a laterally extending arc snuffing or quenching member 66 of insulating material which lies over the contact 60. Lever 63 is provided with a roller 67 of insulating material which rolls over the upper surface of the contact 61. Said lever is also bent laterally and its outer end when in operative position lies in the path of movement of the operating pins 53 on the rotating table. The horizontal member 62 is slidable vertically upon the side vertical members 68 of the frame and is connected by links 69 to arms 70 on a shaft 71 journaled in the stationary frame and connected by an arm 72 to a link 73 connected at its other end to the upper end of the lever 41.

Figure 1:
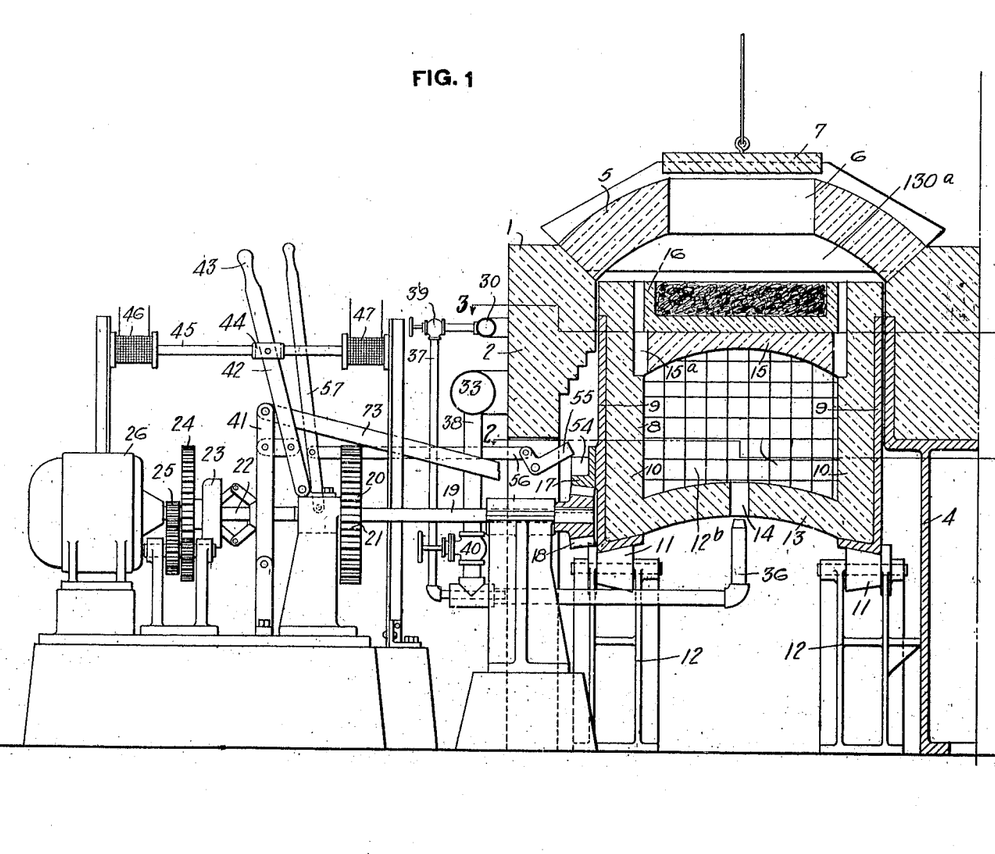
Figure 1 is a view partly in elevation and partly in section, showing the operating mechanism and one half of the furnace at one station thereof.

In Figs. 1, 9 and 10 the solenoid 46 has been energized by closing its circuit to close clutch 23, so that the table or hearth is rotating to a new position. The switch carrying portion of the frame has been elevated to its upper position, which lifts the upper end of the lever 63 into the path of movement of the pins 53. In Fig. 9 one of said pins has just engaged the lever 63. Further movement of the hearth causes said pin to oscillate the lever 63 and traverse the roller 67 over the contact 61, depressing the same to the position shown in dotted lines, Fig. 9, into contact with the spring contact 60. The same movement of lever 63 causes the arc snuffing member 66 to travel backwardly over the contact 60 to a position beyond the end of the contact 61. As soon as the switch 52 is closed, as described, the solenoid 47 is energized, which oscillates the lever 42 to the right in Fig. 1 and opens the clutch 53. The same movement, through the link 73, lowers the frame carrying the switch 52 until the upper end of the lever 63 is below the path of movement of the pin 53. The spring 61 has sufficient resiliency so that when the lever 63 is disengaged from the pin 53 said spring moves upwardly and causes the roller 67 to travel backwardly along said spring until the lever mechanism reaches the position shown in full lines, Fig. 9, in which position of the parts the switch is ready, when again elevated to be closed by the next pin 53 on the rotating table. During the opening movement of the switch the member 66 rides over the upper surface of the contact 60 and in fact during the first portion of the opening movement of the switch said member enters the space between the two contacts so that it interposes an insulated member between the two contacts of the switch and quickly snuffs out or quenches the arc, thereby avoiding injury to the contacts and producing a quick action of the switch.

Figure 7:
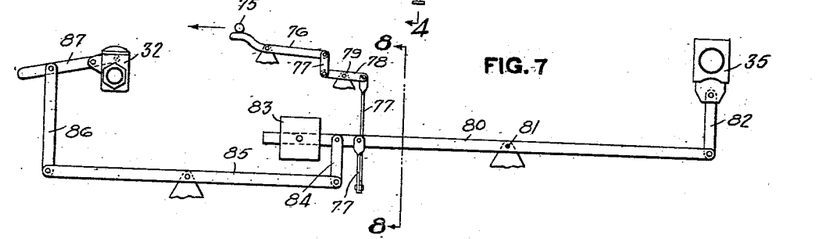
Fig. 7 is a detail view of the mechanism for automatically controlling the gas and air supplies.
Figure 8:
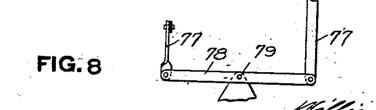
Fig. 8 is a detail cross section on the line 8—8, Fig. 7.

The rotating table also automatically controls the supply of air and gas to the several sections of the rotating furnace hearth. As shown in Fig. 1, the burning fuel is supplied to the several compartments of the hearth by a nozzle 36 located directly below an opening 14 in the floor of each compartment. During the rotating movement of the hearth it is desirable to shut off the supply of fuel and air to avoid directing the flame against the solid bottom of the hearth and thereby wasting the fuel and possibly burning out the hearth itself. For this purpose the rotating table is provided with a second set of outwardly extending pins or projections 75, one located at each section of the table. In the stationary position of the hearth, during the drawing operation, one of said pins engages one end of a lever 76 connected by links 77 and levers 78 fulcrumed at 79 on the stationary frame to one arm of a long lever 80 pivoted at 81 to the stationary frame. One arm of said lever is connected by a link 82 to the valve 35 in the main air supply conduit 34. The other arm of said lever is provided with a counterweight 83 and is connected by a link 84 to a lever 85 connected by a link 86 to one arm of a lever 87, the other arm of which is arranged to operate the valve 32 in the main gas supply conduit 31. In the position of the parts shown in Figs. 7 and 8 both the air and gas supply valves 35 and 32 are open, so that a full supply of fuel is being delivered to each of the sections of the furnace. As soon as the table is rotated to move the pots to new stations the pin 75 passes off from the end of the lever 76, and the lever mechanism shown in Fig. 7 is oscillated by the counterweight 83 to close both of the valves 35 and 32, thereby shutting off both the gas and air supplies. When the table reaches its new position the pin 75 at the next section of the table engages the lever 76 and again oscillates the same, thereby turning on the gas supplies to the several compartments of the furnace.

Figures 4, 6:
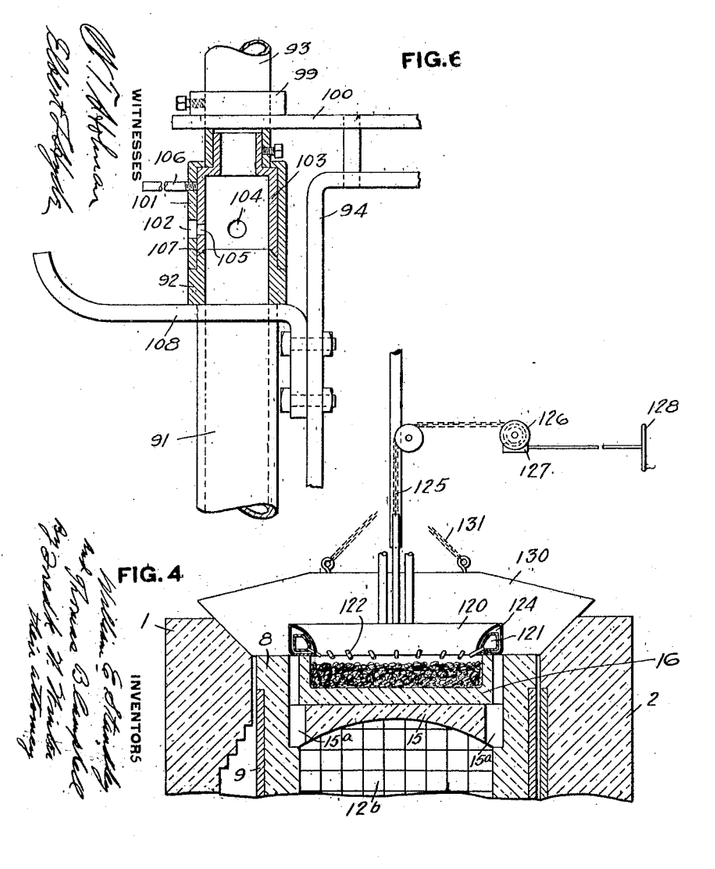
Fig. 4 is a detail sectional elevation on the line 4—4, Fig. 3.
Fig. 6 is a detail section on the line 6—6, Fig. 5.
Figure 5:
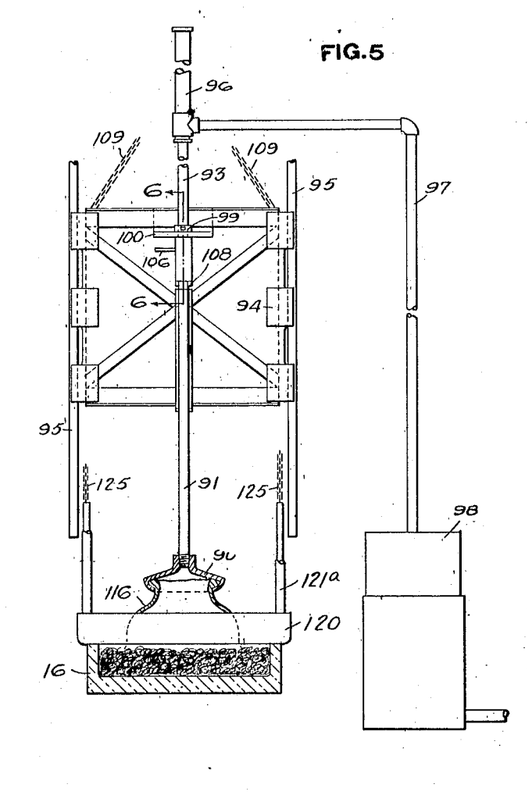
Fig. 5 is a detail elevation of the drawing head or bait and its carriage.

The glass is drawn at station D by the mechanism shown in Figs. 5 and 6. Said mechanism comprises a drawing head or bait 90 attached to the lower end of a pipe 91 and provided at its upper end with a collar 92. The head and its pipe 91 are detachably connected to an upwardly extending pipe 93 carried by a frame 94 traveling along vertical guideways 95, said pipe 93 telescoping through a stuffing-box into an upwardly extending pipe 96 connected by a pipe 97 to a source of compressed air 98. Referring to Fig. 6, the pipe 93 is provided near its lower end with a collar 99 resting on an arm 100 of the carriage 94. The lower end of said pipe, below said arm, is provided with a hollow casing 101 provided with a large opening 102 in its periphery. Within said casing is a valve body, consisting of a cylinder or thimble 103 having a large opening 104 and a small opening 105 therein and also provided with an operating arm 106 extending outwardly through an annular slot in the casing 101. The lower end of the thimble 103 is ground off to make a tight joint with the upper end of the pipe 91 of the head or bait, as indicated at 107. Collar 92 of the pipe 91 rests on two arms of a fork 108 attached to the carriage 94, and which straddle the pipe 91. In connecting the drawing head to the carriage the pipe 91 is passed between the arms of the fork 108 and the upper end of said pipe is pushed upwardly into the lower end of the casing 101, the pipe 93 being simultaneously pushed upwardly to lift its collar 99 from the arm 100. The bait pipe is then swung down to the position shown in Fig. 6, with its collar 92 resting on the arms 108 and the pipe 93 drops down by gravity over the upper end of the pipe 91, or to the position shown in Fig. 6. This is a very simple connection which enables the bait and its pipe 91 to be readily attached to and detached from the pipe 93 whenever desired.

Carriage 94 is connected by a cable 109 to a winding drum 110 (see Fig. 11) connected by a friction clutch 111 to a motor 112. Said clutch is normally held in closed position by a spring (not shown), so that whenever the motor is operated the drum 110 is rotated to lift the bait. Said clutch, however, may be opened whenever desired to allow the bait to unwind the drum 110 and drop to its lower position by gravity. For this purpose the clutch is provided with an operating lever 113 connected by a link 114 to the core of a solenoid 115, the coil of which is in a circuit containing a switch 116.

In drawing a glass cylinder at station D the bait is lowered into the molten glass in the pot at said station and is raised several inches to allow the mass of glass attached to the bait to solidify. During this operation valve member 103 is rotated by its handle 106 to a position in which the large opening 104 is said valve member is opposite the opening 102 in the casing, so that a comparatively large quantity of air from the source 98 escapes to the atmosphere. As soon as a mass of glass has been collected and hardened upon the bait it is raised slowly by operating the motor 112 to lift the carriage 94, and during this operation the valve member is in the position shown in Fig. 6, with its small opening 105 opposite the large opening 102 in the casing. Consequently more air is supplied from the source 98 to the space within the glass cylinder being formed and indicated at 116. This larger air supply expands the cylinder to a large diameter and supplies the air to fill the space within said cylinder as the bait rises. The cylinder is maintained of uniform diameter throughout the drawing operation by manipulating the speed of the motor 112, as hereinafter described. In other words, if the operator detects any impending enlargement of the diameter of the cylinder being formed the motor speed is increased, while if the cylinder becomes smaller the motor speed is decreased.

When the cylinder is fully formed and of the proper length it is cut off at its lower end. This is preferably done by a melting operation, and with devices more fully described and claimed in a co-pending application of William E. Standley for cutting off device for glass drawing apparatus, filed August 20, 1915, Serial No. 46,442. As shown in Fig. 4, the furnace is provided at the drawing station with an annular ring 120 having inner and outer walls forming two passages therein. This ring is of larger size than the diameter of the largest glass cylinder to be drawn and surrounds the same during the drawing operation. It is preferably of heavy cast metal, so that it forms a mass of metal lying closely adjacent to the upper surface of the metal at the beginning of the drawing operation and thereby rapidly conducts the heat away from the bait during the attachment of the glass thereto. The inner wall of said ring forms a channel or conduit 121 for a gas supply, which is conducted thereto in any suitable manner, such as by a pipe or pipes 121ª. Spaced at intervals around the inside of said ring are a series of small pipes 122 connected at their inner ends to the conduit 121, so that said pipes deliver a series of jets of gas closely spaced around the inner periphery of said ring. The glass cylinder is cut off at the proper time by turning on the gas supply to said ring and thereby producing an annular sheet of flame which melts off the cylinder near its bottom. Between the inner and outer walls of the ring is an annular space 124 connected to a water supply for circulating water therethrough for cooling purposes.

Ring 120 is preferably provided with means for raising and lowering the same so as to move it out of the way of the pots when the furnace is rotated from one station to another. As shown, said ring is provided with upwardly extending rods connected to cables 125 passing over sheaves to a drum 126 which may be rotated in any suitable manner, such as by the worm 127 connected to a worm wheel thereon and operated by a hand wheel 128.

The drawing operation must be conducted at a substantially uniform temperature and therefore without interference by the other stations of the furnace, whose temperature may vary. Therefore the stationary body of the furnace at each side of the drawing station is provided with a vertically movable wall or damper 130, said dampers during the drawing operation resting upon the upper surface of the rotating furnace body 8, as shown in Fig. 4, and thereby closing this compartment or section of the furnace, and being connected by cables 131 to suitable operating means, not shown, by means of which said walls may be lifted slightly to rotate the furnace. Stationary dampers or walls 130ª may also be provided at the other stations of the furnace, whose lower edges are slightly above the upper edge of the pot so that it will pass the same.

Suitable means is also provided for varying the speed of the motor 112 for raising and operating the bait, as more fully shown in Fig. 11. As illustrated, the leads 48 and 49 supply 220 volt direct current to the motor 26 through the starting box 135 and controlling switch 136. Motor 112 is controlled by the switch 137 having two arms provided with knife switches controlling the circuits 138 and 139. Circuit 138 is connected to a 60 volt source of current and includes the starting box 140, an extra resistance 141 if desired, and the ordinary rheostat 142. This is the armature circuit. The field circuit 143 includes the field rheostat 144 and is connected to the 220 volt circuit main 48. Circuit 139 is also connected to the 220 volt line and is shunted around the starting box 140 and resistance 141, so that it includes merely the armature rheostat 142. To operate the motor at low speed switch 137 is turned to the position shown in full lines in Fig. 11, which throws the 60 volt line into the motor armature. The motor speed can then be regulated by means of the starting box 140 and the armature rheostat 142. At high speed the switch is turned to its other position which connects the armature directly to the 220 volt line and its speed is then controlled by the armature rheostat 142.

The machine described produces a better quality of glass than prior machines because the glass is held in each pot at both the charging and settling stations for a sufficient length of time to enable all air blisters or bubbles to expand and to escape from the glass so that it becomes of homogeneous texture and works up into a cylinder without flaws or imperfections. The apparatus also reduces the cost of the glass because it dispenses with a number of the laborers required on ordinary glass-making machines, especially the laborers necessary for handling the excess glass remaining in each pot after the drawing operation, which in many cases is a considerable item. In the present machine such glass is allowed to remain in each pot and is carried around to the reheating and charging stations and is added to the next batch, so that it does not have to be removed from the pots. The avoidance of the waste glass also decreases the fuel consumption. The apparatus can be operated readily with a minimum number of operators and has a greater output than the ordinary machines for this purpose.

What we claim is:—

1. Glass drawing apparatus comprising a furnace housing, a substantially cylindrical rotatable hearth therein having a plurality of segmental compartments heat insulated from each other, each compartment containing a checker-work and having an opening through the bottom thereof for a gas jet and being arranged to support a glass pot near its top and permit the gases to pass upwardly around the pot, means for rotating the hearth to successively position the pots adjacent the glass drawing mechanism, and gas heating means adjacent certain positions of the hearth compartments to heat said compartments in such positions.

2. Glass drawing apparatus comprising a furnace housing, a substantially cylindrical rotatable hearth therein having a plurality of segmental compartments heat insulated from each other, each compartment containing a checker work and having an opening through the bottom thereof for a gas jet and being arranged to support a glass pot near its top and permit the gases to pass upwardly around the pot, means for rotating the hearth to successively position the pots adjacent the glass drawing mechanism, gas heating means adjacent certain positions of the hearth compartments to heat said compartments in such positions, and means controlled by the hearth for automatically shutting off the heating means as the hearth moves from one position to the other and automatically turning it on as it reaches the next position.

3. Glass drawing apparatus, comprising a rotatable cylindrical hearth divided into four sections by radial heat insulating walls, a checker work in each section, an opening through the bottom of each section for admission of a gas jet, a glass pot positioned above each section with suitable spaces for escape of the gases, a glass drawing mechanism adjacent the hearth arranged to receive glass from the pots as they move adjacent said mechanism, separate gas jets for heating each of said hearth sections and means operated by movement of the hearth for reducing or cutting off the gas supply as the hearth moves from one position to another and automatically turning it on when the hearth reaches its next position.

In testimony whereof we have hereunto set our hands.

WILLIAM E. STANDLEY.
THOMAS B. CAMPBELL.

Witnesses:
ELBERT L. HYDE,
SUE B. FRITZ.